United States Patent [19]

Hefner, Jr.

[11] Patent Number: 4,515,934
[45] Date of Patent: May 7, 1985

[54] VINYL ESTER RESINS CONTAINING TRIAZINE OR BOTH TRIAZINE AND OXAZOLINE GROUPS

[75] Inventor: Robert E. Hefner, Jr., Lake Jackson, Tex.

[73] Assignee: The Dow Chemical Company, Midland, Mich.

[21] Appl. No.: 590,819

[22] Filed: Mar. 19, 1984

[51] Int. Cl.³ .................. C08G 59/26; C08F 20/34
[52] U.S. Cl. ................................. 528/92; 528/87; 528/88; 528/93; 528/96; 528/112; 528/103; 526/260; 526/261; 525/531
[58] Field of Search ............... 528/87, 88, 92, 93, 528/96, 112, 103; 525/531; 526/260, 261

[56] References Cited

U.S. PATENT DOCUMENTS

| | | | |
|---|---|---|---|
| 2,741,607 | 4/1956 | Bradley et al. | 260/248 |
| 2,809,942 | 10/1957 | Cooke, Jr. | 260/2 |
| 2,810,706 | 10/1957 | Frazier et al. | 260/45.5 |
| 2,864,805 | 12/1958 | Cooke, Jr. | 260/47 |
| 2,971,942 | 2/1961 | Masters et al. | 260/2 |
| 3,066,112 | 11/1962 | Bowen | 260/41 |
| 3,145,207 | 8/1964 | Wahnsiedle | 526/261 |
| 3,179,623 | 4/1965 | Bowen | 260/47 |
| 3,256,226 | 6/1966 | Fekete et al. | 260/23.5 |
| 3,301,743 | 1/1967 | Fekete et al. | 161/194 |
| 3,367,992 | 2/1968 | Bearden | 260/837 |
| 3,564,074 | 2/1971 | Swisher et al. | 260/837 |
| 3,676,397 | 7/1972 | Clarke | 528/112 |
| 3,708,483 | 1/1973 | Anderson et al. | 260/248 CS |
| 3,723,559 | 3/1973 | Oswald et al. | 528/250 |
| 3,793,248 | 2/1974 | Parret et al. | 528/361 |
| 3,816,283 | 6/1974 | Mani | 528/531 |

FOREIGN PATENT DOCUMENTS 45-1265 1/1970 Japan .

OTHER PUBLICATIONS

Copending application Ser. No. 547,537 filed Oct. 31, 1983, by R. E. Hefner, Jr.
Copending application Ser. No. 576,304 filed Feb. 2, 1984, by R. E. Hefner, Jr.

Primary Examiner—John Kight
Assistant Examiner—Garnette D. Draper
Attorney, Agent, or Firm—J. G. Carter

[57] ABSTRACT

Vinyl ester resin compositions containing triazine groups or both triazine and oxazoline groups are prepared by reacting (a) a polyepoxide containing triazine groups, or (b) a polyepoxide containing both triazine and oxazoline groups, or (c) a mixture of (a) and (b) above with (d) about 0.75 to about 1, preferably from about 0.9 to about 1, moles of a monounsaturated monocarboxylic acid or mixture of monounsaturated monocarboxylic acids per epoxide group in the presence of (e) a suitable quantity of a suitable catalyst.

28 Claims, No Drawings

VINYL ESTER RESINS CONTAINING TRIAZINE OR BOTH TRIAZINE AND OXAZOLINE GROUPS

BACKGROUND OF THE INVENTION

The present invention provides novel oligomeric vinyl ester resins containing triazine groups or containing both triazine and oxazoline groups, as well as cured compositions prepared from said vinyl ester resins.

Vinyl esters are the reaction product of about equivalent amounts of a monounsaturated monocarboxylic acid and a polyepoxide. One class of vinyl esters is described by Bearden in U.S. Pat. No. 3,367,992 where dicarboxylic acid half esters of hydroxyalkyl acrylates or methacrylates are reacted with polyepoxide resins. Bowen in U.S. Pat. Nos. 3,066,112 and 3,179,623 describes the preparation of vinyl esters from monocarboxylic acids such as acrylic and methacrylic acid. Bowen also describes alternate methods of preparation wherein a glycidyl methacrylate or acrylate is reacted with the sodium salt of a dihydric phenol such as bisphenol-A. Vinyl ester resins based on epoxy novolac resins are described in U.S. Pat. No. 3,301,743 to Fekete et al. Fekete et al describes vinyl esters where the molecular weight of the polyepoxide is increased by reacting a dicarboxylic acid with the polyepoxide resin as well as acrylic acid, etc. in U.S. Pat. No. 3,256,226. Other functional compounds containing a group which is reactive with an epoxide group, such as an amine, mercaptan and the like, may be utilized in place of the dicarboxylic acid. All of the above-described compositions, which contain the characteristic linkages

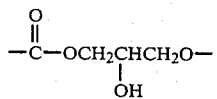

and terminal polymerizable vinylidene groups are classified as vinyl esters and are incorporated herein by reference.

The vinyl ester is typically combined with a reactive diluent, a copolymerizable vinyl monomer, to alter the viscosity of the mixture, to vary the properties of the cured coating, or for other known reasons. Most any vinyl monomer may be employed which is copolymerizable with the unsaturated groups of the vinyl ester. Such monomers include both monovinyl and polyvinyl monomers. Typical monomers include the alkenyl aromatic monomers such as styrene, α-methylstyrene, vinyltoluene, t-butyl styrene and the like; and alkyl and hydroxyalkyl esters of acrylic and methacrylic acid such as methyl, ethyl, propyl, butyl, cyclohexyl and hydroxyethyl, hydroxypropyl and hydroxybutyl acrylates and methacrylates. In addition to the above, other monomers are especially useful for ultra-violet light curable systems such as 2-acetoxyalkyl acrylates; pentaerythritol di-, tri- or tetra-acrylates and the like and may be added in any order.

The vinyl ester and copolymerizable vinyl monomer blend is a crosslinkable vinyl ester resin which is cured by mixing in a free radical forming catalyst in an amount ranging from 0.1 to about 5 percent by weight, preferably 1 to 2 percent by weight. Examples of these catalysts are benzoyl peroxide, tertiary butyl hydroperoxide, methylethylketone peroxide and the like. It is frequently of value to add an accelerator such as N,N-dimethylaniline, cobalt naphthenate and the like.

Preparation of polyepoxides containing triazine groups is taught by R. E. Hefner, Jr. in copending application Ser. No. 547,537, filed 10-31-83 which is incorporated herein by reference. The process of this invention uses an easily prepared mixed cyanate of a diphenol or polyphenol. More specifically, the process disclosed therein comprises reacting at least one material having an average of more than one aromatic hydroxyl group per molecule with at least 0.01 but not more than 0.95, preferably from about 0.05 to about 0.55, moles of cyanogen halide or mixture of cyanogen halides per aromatic hydroxyl group in the presence of a suitable base in a quantity of from about 0.01 to about 1.1, preferably from about 0.05 to about 0.6, moles per aromatic hydroxyl group at a temperature and time sufficient to essentially complete the reaction and thereafter recovering the resultant cyanate mixture; trimerizing the cyanate mixture in the presence of a suitable trimerization catalyst at a temperature and time to essentially complete the trimerization reaction; epoxidizing the resultant trimerized product in a conventional manner by reaction with an epihalohydrin with subsequent dehydrohalogenation with a basic-acting material and finally recovering the resultant triazine functional glycidyl ether product. Excellent control over the molecular weight and content of triazine groups is provided by this process. The epoxy resin compositions of this invention possess unusually high thermal stability as well as excellent overall physical and mechanical properties.

Preparation of polyepoxides containing triazine and oxazoline groups is disclosed in copending application Ser. No. 576,304 filed Feb. 2, 1984. The process disclosed therein uses the aforementioned mixed cyanate of a diphenol or polyphenol. Co-oligomerization of this cyanate mixture with an epoxy resin such as the diglycidyl ether of bisphenol A, provides hydroxyaromatic oligomers containing both triazine and oxazoline groups. Oligomers prepared from co-oligomerization of the mixed cyanate of a diphenol with an epoxy resin using mole ratios of epoxy groups to nitrile groups of about 1 to 10 to about 1 to 40 or more are most preferred in the process of this invention. The oligomers, and unreacted diphenol, if any, are then epoxidized using methods well known in the art. The epoxy resin compositions of this invention possess excellent thermal stability as well as enhanced mechanical properties.

The vinyl ester compositions of the present invention contain triazine groups or both triazine and oxazoline groups and are derived by reaction of the respective triazine functional or triazine and oxazoline functional epoxy resins with a monounsaturated monocarboxylic acid. The invention consists of the vinyl esters and the vinyl ester and copolymerizable vinyl monomer formulations, whether or not cured.

SUMMARY OF THE INVENTION

The present invention pertains to vinyl ester resin compositions containing triazine groups or both triazine and oxazoline groups. Said compositions are prepared by reacting (a) a polyepoxide containing triazine groups, or (b) a polyepoxide containing both triazine and oxazoline groups, or (c) a mixture of (a) and (b) above with (d) from about 0.75 to about 1, preferably from about 0.9 to about 1, moles of a monounsaturated monocarboxylic acid or mixture of monounsaturated monocarboxylic acids per epoxide group in the presence of (e) a suitable quantity of a suitable catalyst. A quantity of from about 0.01 to about 2 percent by weight has been found to be a particularly suitable quantity of catalyst.

Another aspect of the present invention pertains to vinyl ester resin and copolymerizable ethylenically unsaturated monomer formulations containing from about 1 to about 99, preferably from about 30 to about 70 percent by weight of vinyl ester resin and from about 99 to about 1, preferably from about 70 to about 30 percent by weight of at least one copolymerizable ethylenically unsaturated monomer.

Another aspect of the present invention pertains to compositions comprising a mixture of vinyl ester resins comprising (A) from about 1 to about 99, preferably from about 5 to about 50 percent by weight of the aforementioned vinyl ester resin compositions and (B) from about 99 to about 1, preferably from about 95 to about 50 percent by weight of a vinyl ester resin composition resulting from reacting (1) an epoxy resin represented by formulas VI or VII or a mixture of such epoxy resins and at least one of acrylic acid or methacrylic acid.

Another aspect of the present invention concerns a composition comprising (I) from about 1 to about 99 percent by weight, preferably from about 30 to about 70 percent by weight of the above mixture of vinyl ester resins and (II) from about 99 to about 1, preferably from about 70 to about 30 percent by weight of at least one copolymerizable ethylenically unsaturated monomer.

A further aspect of the present invention pertains to the product resulting from curing the aforementioned vinyl esters or vinyl ester and copolymerizable vinyl monomer formulations.

DETAILED DESCRIPTION OF THE INVENTION

Suitable materials having an average of more than one aromatic hydroxyl group per molecule which can be employed to prepare the cyanate mixture precursor to the triazine functional oligomers or the triazine and oxazoline functional oligomers include, for example, those represented by the formulas:

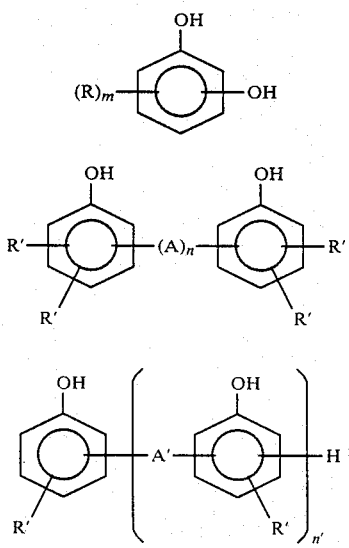

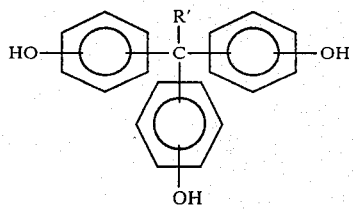

wherein A is a divalent hydrocarbon group having from 1 to about 12, preferably from about 1 to about 6 carbon atoms, $$-S-, -S-S-, -\underset{O}{\overset{O}{\|}}S-, -\underset{}{\overset{O}{\|}}S-, -\underset{}{\overset{O}{\|}}C-, -O-\underset{}{\overset{O}{\|}}C-O-, -O-,$$

[structures with R' and m' subscripts]

and the like; each A' is a divalent hydrocarbon group having from 1 to about 3, preferably 1, carbon atoms; each R is independently hydrogen, halogen, preferably chlorine or bromine, hydrocarbyl group having from 1 to about 6 carbon atoms or a hydroxyl group; each R' is independently hydrogen or a hydrocarbyl group having from 1 to about 6 carbon atoms or a halogen, preferably chlorine or bromine; m has a value from zero to about 2; m' has a value from 1 to about 100, preferably from 1 to about 10; n has a value of zero or 1 and n' has a value from about 1.01 to about 6.

Particularly suitable aromatic hydroxyl-containing compounds include, for example, o-, m- and p-dihydroxybenzene, 2-tert butyl hydroquinone, 2,4-dimethyl resorcinol, 2,5-di-tert butyl hydroquinone, tetramethyl hydroquinone, 2,4,6-trimethyl resorcinol, 4-chlororesorcinol, 4-tert butyl pyrocatechol, 1,1-bis(4-hydroxyphenyl)ethane; 2,2-bis(4-hydroxyphenyl)propane; 2,2-bis(4-hydroxyphenyl)pentane; bis(4,4'-dihydroxyphenyl)methane; 4,4'-dihydroxydiphenyl, 2,2'-dihydroxydiphenyl, 3,3',5,5'-tetramethyl-4,4'-dihydroxydiphenyl, 3,3',5,5'-tetrachloro-4,4'-dihydroxydiphenyl, 3,3',5,5'-tetrachloro-2,2'-dihydroxydiphenyl, 2,2',6,6'-tetrachloro-4,4'-dihydroxydiphenyl, 4,4'-bis((3-hydroxy)phenoxy)-diphenyl, 4,4'-bis((4-hydroxy)phenoxy)-diphenyl, 2,2'-dihydroxy-1,1'-binaphthyl, and other dihydroxydiphenyls; 4,4'-dihydroxydiphenyl ether, 3,3',5,5'-tetramethyl-4,4'-dihydroxydiphenyl ether, 3,3',5,5'-tetrachloro-4,4'-hydroxydiphenyl ether, 4,4'-bis(p-hydroxyphenoxy)-diphenyl ether, 4,4'-bis(p-hydroxyphenyl isopropyl)-diphenyl ether, 4,4'-bis(p-hydroxyphenoxy)-benzene, 4,4'-bis(p-hydroxyphenoxy)-diphenyl ether, 4,4'-bis(4(4-hydroxyphenoxy)phenyl sulfone)-diphenyl ether, and other dihydroxydiphenyl ethers; 4,4'-dihydroxydiphenyl sulfone, 3,3',5,5'-tetramethyl-4,4'-dihydroxydiphenyl sulfone, 3,3'5,5'-tetrachloro-4,4'-dihydroxydiphenyl sulfone, 4,4'-bis(p-hydroxyphenyl isopropyl)-diphenyl sulfone, 4,4'-bis((4-hydroxy)-phenoxy)-diphenyl sulfone, 4,4'-bis((3-hydroxy)-phenoxy)-diphenyl sulfone, 4,4'-bis(4-(4-hydroxyphenyl-isopropyl)-phenoxy)-diphenyl sulfone, 4,4'-bis(4(4-hydroxy)diphenoxy)-diphenyl sulfone, and other diphenyl sulfones; 4,4'-dihydroxydiphenyl methane, 4,4'-bis(p-hydroxyphenyl)-diphenyl methane, 2,2'-bis(p-hydroxyphenyl)-propane, 3,3',5,5'-tetramethyl-2,2'-bis(p-hydroxyphenyl)-propane, 3,3',5,5,'-tetrachloro-2,2'-bis(p-hydroxyphenyl)propane, 1,1-bis(p-hydroxyphenyl)-cyclohexane, bis-(2-hydroxy-1-naphthyl)-methane, 1,2-bis(p-hydroxyphenyl)-1,1,2,2-tetramethyl ethane, 4,4'-dihydroxybenzophenone, 4,4'-bis(4-hydroxy)phenoxy-benzophenone, 1,4-bis(p-hydroxyphenyl isopropyl)-benzene, phloroglucinol, pyrogallol, 2,2',5,5'-tetrahydroxy-diphenyl sulfone, other dihydroxydiphenyl alkanes, mixtures thereof and the like.

Suitable cyanogen halides which can be employed to prepare the cyanate mixture precursor include, for example, cyanogen chloride, cyanogen bromide, mixtures thereof and the like.

If desired, the method reported in Organic Synthesis, Vol. 61, page 35-37 (1983), published by John Wiley & Sons, may be used to generate the required amount of cyanogen halide in situ, although this is less preferred than using neat cyanogen halide.

Suitable base materials which can be employed to prepare the cyanate mixture precursor include both inorganic bases such as alkali metal hydroxides and tertiary amines, such as, for example, sodium hydroxide, potassium hydroxide, triethylamine, pyridine, lutidine, mixtures thereof and the like. The tertiary amines are most preferred as the base material.

Suitable trimerization catalysts which can be employed for conversion of the cyanate mixture to triazine functional oligomers include, for example, metal salts of carboxylic acids, such as, for example, lead octoate, zinc stearate, zinc acetylacetonate, usually at concentrations of about 0.001 to about 5 percent. Most preferred catalysts are cobalt naphthenate and cobalt octoate, mixtures thereof and the like. The aforementioned catalysts are also employed for co-oligomerization of the cyanate mixture with an epoxy resin to provide oligomers containing both triazine and oxazoline groups.

Suitable epoxy resins for co-oligomerization with the cyanate mixture are those represented by the formulas:

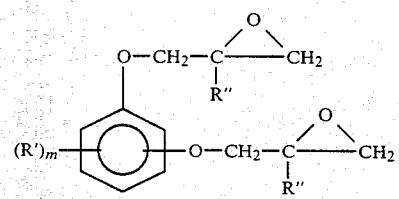

V.

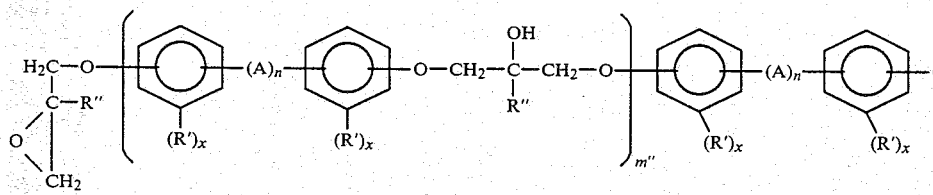

VI.

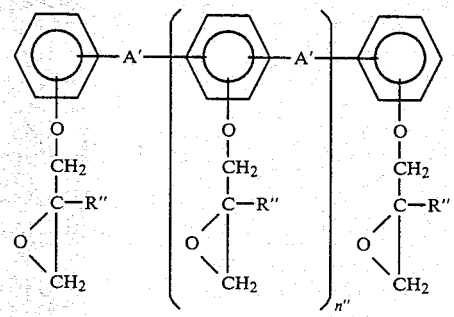

VII.

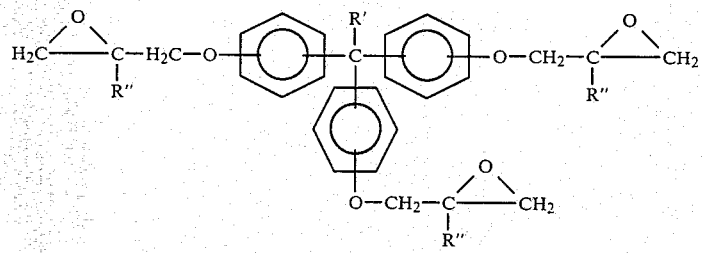

VIII.

wherein A, A', R', m and n are as herein before defined, x has a value of from 0 to about 4 and n" has a value of from 0 to about 25, preferably from 0 to about 5; m" has a value of from 0 to about 40, preferably from 0.1 to about 20; R" is hydrogen or a hydrocarbyl group having from 1 to about 4 carbon atoms.

Although the co-oligomerization of the cyanate mixture with an epoxy resin provides both triazine and oxazoline functionality in the oligomer product, it is felt that other reactions may also be occurring. Unreacted phenolic groups may copolymerize with a portion of the epoxide groups of the epoxy resin during the co-oligomerization reaction. Unreacted phenolic groups may react with cyanate groups to form iminocarbonate linkages which may in turn react with remaining epoxide groups.

Epoxidation of the triazine functional oligomers or triazine and oxazoline functional oligomers can be performed by the known methods described in *Handbook of Epoxy Resins* by Lee and Neville, McGraw-Hill, 1967, which is incorporated herein by reference. This usually includes reacting the respective oligomeric product with an epihalohydrin followed by dehydrohalogenation with a basic-acting material such as, for example, an alkali metal hydroxide and finally recovering the resulting glycidyl ether product.

Reaction to provide the cyanate mixture is usually conducted at a temperature of from about −40° C. to about 60° C., preferably from about −20° C. to about 25° C. for from about 10 minutes (600 s) to about 120 minutes (7200 s), preferably from about 10 minutes (600 s) to about 60 minutes (3600 s).

If desired, the reaction to provide the cyanate mixture can be conducted in the presence of an inert solvent reaction medium. Suitable such solvents include, for example, water, chlorinated hydrocarbons, ketones, mixtures thereof and the like. Most preferred as solvents are acetone or methylene chloride.

The trimerization or co-oligomerization reactions are both usually conducted at a temperature of from about 70° C. to about 250° C., preferably from about 70° C. to about 200° C. for a period of from about 15 minutes (900 s) to about 120 minutes (7200 s), preferably from about 30 minutes (1800 s) to about 75 minutes (4500 s). These reactions are preferably performed in the presence of the aforementioned catalyst(s).

Suitable monounsaturated monocarboxylic acids for reaction with the polyepoxides of the triazine functional oligomers or triazine and oxazoline functional oligomers include acrylic acid, methacrylic acid, cyanoacrylic acid, crotonic acid, α-phenylacrylic acid, methoxyacrylic acid and the like or mixtures thereof. Methacrylic acid is a most preferred monounsaturated monocarboxylic acid. A mole ratio of 0.9 to 1 monounsaturated monocarboxylic acid group per epoxide group is preferred with a ratio of 0.96 to 0.98 being most preferred. The reaction between the polyepoxide of the triazine functional oligomers or triazine and oxazoline functional oligomers and a monounsaturated monocarboxylic acid is typically performed in the presence of a catalyst. Suitable catalysts for use herein are well known in the prior art. Aqueous chromium trichloride is a most preferred catalyst at concentrations of about 0.01 to 0.3 percent by weight of the polyepoxide employed.

A suitable process inhibitor is typically used in the reaction between the polyepoxide of the triazine functional oligomers or triazine and oxazoline functional oligomers and a monounsaturated monocarboxylic acid to prevent gelation (homopolymerization of the vinyl ester and/or copolymerization of the vinyl ester with unreacted monounsaturated monocarboxylic acid). Suitable inhibitors for use herein are well known in the prior art. Hydroquinone activated with air is a most preferred inhibitor at concentrations of from about 100 to about 500 ppm based on the weight of the polyepoxide and monounsaturated monocarboxylic acid used.

The reaction to produce the vinyl ester is usually conducted at a temperature of from about 50° C. to about 125° C., preferably from about 80° to about 120° C. for from about 120 minutes (7200 s) to about 720 minutes (43,200 s), preferably from about 240 minutes (14,400 s) to about 480 minutes (28,800 s). Although reaction times and reaction temperatures can vary substantially, most preferred vinyl-ester compositions are obtained by reacting to a specific conversion, typically 1.5 to 0.25 percent carboxylic acid.

The vinyl ester product containing triazine or triazine and oxazoline groups is typically combined with one or more reactive diluents such as copolymerizable ethylenically unsaturated monomers.

A wide selection of polymerizable monomers containing a $>C=CH_2$ group is available from the many known classes of vinyl monomers. Representative species are the vinyl aromatic compounds which include such monomers as styrene, α-methylstyrene, vinyl toluenes, halogenated styrenes, t-butylstyrene, divinyl benzene and the like.

Other suitable monomers include the methyl, ethyl, isopropyl, octyl, etc., esters of acrylic or methacrylic acid, vinyl acetate, diallyl maleate, dimethallyl fumarate, acidic monomers such as acrylic acid, methacrylic acid, crotonic acid and amide monomers such as acrylamide, N-alkyl acrylamides and the like and mixtures thereof.

Preferred polymerizable monomers containing a $>C=CH_2$ group are styrene, vinyl toluene, ortho-, meta- and para-halostyrenes, vinyl naphthalenes, the various alpha-substituted styrenes, as well as the various di-, tri- and tetrahalo styrenes, and acrylic, methacrylic and crotonic acid esters which include both the saturated alcohol esters and the hydroxyalkyl esters.

The blended vinyl ester resin composition may consist of up to 99 percent by weight of polymerizable monomer containing the $>C=CH_2$ group with the balance of the combined weight consisting of said vinyl ester resin. Preferably, the resin composition consists of 30–70 percent by weight of said monomer and 70–30 percent by weight of said vinyl ester resin.

While it is preferred in many applications to blend the vinyl ester resin with a polymerizable monomer, the present invention is not limited thereto. The vinyl ester resin can be cured and polymerized in the absence of such a monomer and can be applied and utilized as solutions in a nonpolymerizable solvent, such as is practiced in certain coating operations.

According to the present invention, the curing of the resin compositions is effected by the application of heat and/or pressure in the presence of a free radical yielding catalyst. Catalysts that may be used for the curing or polymerization are preferably the peroxide catalysts, such as benzoyl peroxide, lauroyl peroxide, t-butyl hydroperoxide, t-butylperbenzoate, methyl ethyl ketone peroxide, potassium persulfate and the like. The amount of the catalyst added will preferably vary from 1 to about 2 percent by weight of reactants. Temperatures employed may vary over a considerable range but usually are in the range of 20° to 250° C.

Additionally, more rapid curing of the thermosetting resin compositions may be accomplished by the addition of accelerating agents such as lead or cobalt naphthenate, N,N-dimethylaniline and the like, usually in concentrations ranging from about 0.1 to about 2 weight percent.

Preferred compositions of this invention also include blends of the vinyl ester resins containing triazine or triazine and oxazoline groups with vinyl ester resins of the prior art, as well as the cured compositions prepared from said blends. The cured compositions of said vinyl ester resin blends possess improvements in one or more physical or mechanical properties such as tensile strength, flexural strength and/or percent elongation and ductility.

The vinyl ester resins containing triazine or triazine and oxazoline groups of this invention are useful to make laminates, castings, coatings, and the like. The laminates are made by mixing into the vinyl ester resin a known amount of a free radical forming catalyst and optionally, an accelerator and adding this mixture to a suitable fibrous reinforcement such as asbestos fibers, carbon fibers, fibrous glass or inorganic fibers. The vinyl ester resin can be rolled, sprayed, or impregnated into the fibrous reinforcement such as fibrous glass. When fibrous glass is used, it can be in any form such as chopped strands, filaments, glass ribbons, glass yarns, or reinforcing rats.

The vinyl ester resin may be compounded with solvents, pigments, low profile additives or other resinous products and cured to form useful coatings in a manner well known in the art.

The following examples are illustrative of the invention, but are not to be construed as to limiting the scope thereof in any manner:

EXAMPLE 1

A. Preparation of Diphenol Cyanate Mixture

Cyanogen bromide (0.825 mole, 87.39 grams) was added to a reactor containing a stirred solution of bisphenol A (1.5 moles, 342.45 grams) in acetone (950 milliliters) cooled to −5° C. under a nitrogen atmosphere. The stirred solution was allowed to equilibrate at −5° C., then triethylamine (0.75 mole, 75.9 grams) was added to the reactor over a 20 minute (1200 s) period and so as to maintain the reaction temperature at −1° to −5° C. After completion of the triethylamine addition, the reactor was maintained at −3° to 5° C. for an additional 30 minutes (1800 s), followed by addition of the reaction product to chilled water (1 gallon) with agitation. After 5 minutes (300 s), the water and product mixture was subjected to multiple extractions with three 400 milliliter portions of methylene chloride. The combined methylene chloride extracts were sequentially washed with 500 milliliters of dilute hydrochloric acid (5 percent), 1000 milliliters of water, and then dried over anhydrous sodium sulfate. The dry methylene chloride extract was filtered and solvent removed by rotary evaporation under vacuum. The diphenol cyanate mixture was recovered (337 grams) as a white-colored solid at room temperature (25° C.). Infrared spectrophotometric analysis demonstrated the presence of the nitrile groups as well as unreacted hydroxyl groups. Liquid chromatographic analysis demonstrated the presence of 59.53 area percent bisphenol A, 35.01 area percent bisphenol A monocyanate, and 5.46 area percent bisphenol A dicyanate.

B. Trimerization of Diphenol Cyanate Mixture

A portion of the diphenol cyanate mixture (335 grams) from A above and 6 percent cobalt naphthenate (0.1 percent by weight, 0.34 gram) were thoroughly mixed and placed in a glass tray. The tray was then placed in a forced-air, convection-type oven and maintained for 1.25 hours (4500 s) at 177° C. The hydroxyaromatic oligomers containing triazine groups were recovered in quantitative yield as a transparent, brittle solid at room temperature (25° C.). The oligomers had a greenish-colored cast due to the catalyst. At the 177° C. temperature, the oligomers were still totally fluid. Infrared spectrophotometric analysis demonstrated complete disappearance of the nitrile groups, appearance of the triazine functionality, and the presence of unreacted hydroxyl groups.

C. Epoxidation of Hydroxy Aromatic Oligomers Containing Triazine Groups

A portion (250 grams) of the hydroxyaromatic oligomers containing triazine groups from B above, epichlorohydrin (8.25 moles, 763.05 grams), isopropanol (35 percent by weight of epichlorohydrin used, 410.87 grams), and water (8 percent by weight of epichlorohydrin used, 66.35 grams) were added to a reactor and stirred under a nitrogen atmosphere at 60° C. until a solution was formed. At that time, the reactor was cooled to 50° C. and dropwise addition of a sodium hydroxide (2.97 moles, 118.75 grams) solution in water (475 grams) commenced and was completed over the next 30 minutes (1800 s). During this sodium hydroxide addition, the reaction temperature was allowed to increase to 60° C. and was then held at this temperature. Thirty minutes (1800 s) after the addition of sodium hydroxide solution, a second solution of sodium hydroxide (1.32 mole, 52.78 grams) in water (211.11 grams) was added dropwise to the reactor over the next 20 minutes (1200 s). Fifteen minutes (900 s) later, the reactor was cooled to 40° C. then an initial water wash (250 grams) was added to the reactor and the contents were transferred to a separatory funnel. The water wash layer was separated and discarded while the organic layer was added back into the separatory funnel along with a second water wash (250 grams). The water wash layer was separated and discarded while the organic layer was added back into the separatory funnel with a final water wash (800 grams). Epichlorohydrin (200 grams) was added to the separatory funnel, then the water wash layer was separated and discarded. The recovered organic layer was stripped of solvents by rotary evaporation at 100° C. for 90 minutes (5400 s) under vacuum. The epoxy resin was recovered (346.1 grams) as a transparent, light yellow-colored liquid at room temperature (25° C.). Infrared spectrophotometric analysis demonstrated substantially complete disappearance of hydroxyl groups, appearance of epoxide groups and presence of triazine groups. Epoxide titration revealed the presence of 22.23 percent by weight epoxide (193.43 EEW).

D. Methacrylation of Triazine Functional Epoxy Resin

A portion (300 grams) of the epoxy resin containing triazine groups from C above was added to a reactor and heated to 90° C. Hydroquinone (0.172 grams) then methacrylic acid (129.38 grams) were sequentially added then stirring and sparging with air (0.5 liter per minute) were started. After ten minutes (600 s) at the 90° C. reaction temperature, 33.33 percent aqueous chromium trichloride catalyst (0.375 gram) was added and the temperature controller was set at 110° C. and this temperature was achieved 15 minutes (900 s) later. After 26 minutes (1560 s) at the 110° C. reaction temperature, the temperature controller was set at 112° C. and this temperature was achieved six minutes (360 s) later. After four minutes (240 s) at the 112° C. reaction temperature, the temperature controller was set at 115° C. and this temperature was achieved five minutes (300 s) later. After 4 hours (14,400 s) at the 115° C. reaction temperature, the temperature controller was set at 117° C. and this temperature was achieved three minutes (180 s) later. After 117 minutes (7020 s) at the 117° C. reaction temperature, titration of a sample of the vinyl ester demonstrated the presence of 1.298 percent carboxylic acid. Infrared spectrophotometric analysis demonstrated substantially complete disappearance of epoxide groups, appearance of ester groups and presence of triazine groups. The reactor was cooled to 80° C. then phenothiazine (0.172 gram) and styrene (240.63 grams) were sequentially added to the reactor. The vinyl ester containing triazine groups (668 grams) was recovered as a transparent, light yellow-colored liquid.

COMPARATIVE EXPERIMENT A

A commercial grade of vinyl ester resin was prepared based on the following method:

About 1 equivalent of methacrylic acid was reacted with 0.75 equivalent of an epoxy novolac having an epoxide equivalent weight (EEW) of 176-181 and 0.25 equivalent of a glycidyl polyether of bisphenol A having an EEW of 186-192. The above reactants were heated to 115° C. with a chromium trichloride catalyst system, air and hydroquinone present until the carboxylic acid content reached about 1 percent. The reactants were cooled and then styrene (containing 50 ppm of t-butyl catechol) was added. The final resin diluted with styrene had a pH of 7.7 and contained approximately:

| Contents | Percent by Weight |
|---|---|
| styrene | 36 |
| methacrylic acid | 20.6 |
| epoxy novolac (EEW = 176-181, average functionality = ~3.6) | 32.1 |
| diglycidyl ether of bisphenol A (EEW = 186-192) | 11.3 |
| | 100.00 |

EXAMPLE 2

A portion (100 grams) of the styrenated vinyl ester resin of Example 1-D and a portion (300 grams) of the styrenated vinyl ester resin of Comparative Experiment A were thoroughly mixed together to provide a 25 to 75 percent by weight solution, respectively.

EXAMPLE 3

Portions of the vinyl ester resins of Example 1-D, Example 2, and Comparative Experiment A were used for Brookfield viscosity (25° C.) and SPI gel test (84° C.) determinations. Clear, unfilled ⅛ inch (0.3175 cm) castings were prepared for heat distortion temperature (264 psi, 1820 kPa), tensile and flexural strength, flexural modulus, percent elongation and average Barcol hardness (934-1 scale) determinations. Each casting was cured at room temperature (25° C.) using a cure system of 1 percent by weight benzoyl peroxide and 0.05 percent by weight N,N-dimethylaniline. Twenty-four hours (86,400 s) after the cure exotherm had subsided, post curing for 2 hours (7200 s) at 100° C. was completed. Mechanical properties of tensile (8) and flexural (6) test pieces were determined using an Instron machine with standard test methods (ASTM D-638 and D-790). Heat distortion temperature of clear casting test pieces (2) was determined using an Aminco Plastic Deflection Test (American Instrument Co.) with standard test methods (ASTM D-648 modified). The results are given in Table I.

TABLE I

| | Example 1-D | Example 2 | Comparative Experiment A |
|---|---|---|---|
| Brookfield Viscosity (cp) | 151 | 187 | 260 |
| SPI Gel Test | | | |
| gel time, min./sec. | 15.65/939 | 10.75/645 | 8/480 |
| cure time, min./sec. | 20/1200 | 12.85/771 | 9.5/570 |
| maximum exotherm, °F./°C. | 372/189 | 408/209 | 408/209 |
| Barcol Hardness | 41 | 43 | 39 |
| Heat Distortion Temperature °F./°C. | 221.9/105.5 | 225.1/107.3 | 214/101.1 |
| Tensile Strength × $10^{-3}$ psi/kPa | 9.3/64.1 | 12/82.7 | 9/62.1 |
| Elongation (%) | 2.2 | 4 | 2.8 |
| Flexural Strength × $10^{-3}$ psi/kPa | 21.7/149.6 | 22.7/165.5 | 19.2/132.4 |
| Flexural Modulus × $10^{-5}$ psi/kPa | 5.77/39.78 | 6.17/42.54 | 6.4/44.13 |

EXAMPLE 4

A. Preparation of Diphenol Cyanate Mixture

Cyanogen bromide (1.1 moles, 116.52 grams) was added to a reactor containing a stirred solution of bisphenol A (2 moles, 456.60 grams) in acetone (1050 milliliters) cooled to −5° C. under a nitrogen atmosphere. The stirred solution was allowed to equilibrate at −5° C., then triethylamine (1 mole, 101.19 grams) was added to the reactor over an eighteen minute (1080 s) period and so as to maintain the reaction temperature at −5° to 0° C. After completion of the triethylamine addition, the reactor was maintained at −2° to 5° C. for an additional 30 minutes (1800 s), followed by addition of the reaction product to chilled water (1.5 gallons) with agitation. After 5 minutes (300 s), the water and product mixture was subjected to multiple extraction with three 400 milliliter portions of methylene chloride. The combined methylene chloride extracts were sequentially washed with 500 milliliters of dilute hydrochloric acid (5 percent), 1000 milliliters of water and then dried over anhydrous sodium sulfate. The dry methylene chloride extract was filtered and solvent removed by rotary evaporation under vacuum. The diphenol cyanate mixture was recovered (398.03 grams) as a white-colored solid at room temperature (25° C.). Infrared spectrophotometric analysis demonstrated the presence of the nitrile groups as well as unreacted hydroxyl groups. Liquid chromatographic analysis demonstrated the presence of 57.11 area percent bisphenol A, 35.33 area percent bisphenol A monocyanate and 7.56 area percent bisphenol A dicyanate.

B. Co-oligomerization of Diphenol Cyanate Mixture and an Epoxy Resin

A portion of the diphenol cyanate mixture (388.7 grams), an epoxy resin (25.64 grams) and 6 percent cobalt naphthenate (0.1 percent by weight, 0.41 gram) were thoroughly mixed and placed in a glass tray. The epoxy resin had an epoxide equivalent weight (EEW) of 340.4 and was prepared by reaction of a diglycidyl ether of bisphenol A (EEW=183) (0.8 equiv., 146.4 grams) with bisphenol A (0.4 equiv., 45.66 grams) and benzyltrimethylammonium chloride catalyst (60 percent aqueous) (0.19 gram) at 120° C. for 50 minutes. The tray was then placed in a forced-air, convection-type oven and maintained for 1.25 hours (4500 s) at 177° C. The hydroxyaromatic co-oligomerization product containing triazine and oxazoline groups was recovered in quantitative yield as a transparent, light amber-colored, brittle solid at room temperature (25° C.) Infrared spectrophotometric analysis demonstrated complete disappearance of the nitrile groups, appearance of triazine groups, appearance of oxazoline groups and the presence of unreacted hydroxyl groups.

C. Epoxidation of Hydroxyaromatic Co-oligomerization Product Containing Triazine and Oxazoline Groups A portion of the hydroxyaromatic co-oligomerization product containing triazine and oxazoline groups (225 grams), epichlorohydrin (7.198 moles, 665.99 grams), isopropanol (35 percent by weight of epichlorohydrin used, 358.61 grams), and water (8 percent by weight of epichlorohydrin used, 57.91 grams) were added to a reactor and stirred under a nitrogen atmosphere at 50° C. until a solution was formed. At that time, dropwise addition of a sodium hydroxide (2.59 moles, 103.64 grams) solution in water (414.58 grams) commenced and was completed over the next 30 minutes (1800 s). During this sodium hydroxide addition, the reaction temperature was allowed to increase to 60° C. and was then held at this temperature. Thirty minutes (1800 s) after the addition of sodium hydroxide solution, a second solution of sodium hydroxide (1.15 mole, 46.06 grams) in water 184.26 grams) was added dropwise to the reactor over the next 20 minutes (1200 s). Fifteen minutes (900 s) later, the reactor was cooled to 40° C., then an initial water wash (250 grams) was added to the reactor and the contents were transferred to a separatory funnel. The water wash layer was separated and discarded while the organic layer was added back into the separatory funnel along with a second water wash (250 grams). The water wash layer was separated and discarded while the organic layer was added back into the separatory funnel with a final water wash (800 grams). Epichlorohydrin (200 grams) was added to the separatory funnel, then the water wash layer was separated and discarded. The recovered organic layer was stripped of solvents by rotary evaporation at 100° C. for 90 minutes (5400 s) under vacuum. The epoxy resin was recovered (306.34 grams) as a transparent, light yellow-colored liquid at room temperature (25° C.). Infrared spectrophotometric analysis demonstrated substantially complete disappearance of hydroxyl groups, appearance of epoxide groups and presence of both triazine and oxazoline groups. Epoxide titration revealed the presence of 19.26 percent by weight epoxide (223.26 EEW).

D. Methacrylation of Hydroxyaromatic Co-oligomerization Product Containing Triazine and Oxazoline Groups A portion (282 grams) of the epoxy resin containing triazine and oxazoline groups from C above was added to a reactor and heated to 90° C. Hydroquinone (0.155 grams) then methacrylic acid (105.37 grams) were sequentially added then stirring and sparging with air (0.5 liter per minute) were started. After eleven minutes (660 s) at the 90° C. reaction temperature, 33.33 percent aqueous chromium trichloride catalyst (0.353 gram) was added and the temperature controller was set at 110° C. and this temperature was achieved 8 minutes (480 s) later. After 26 minutes (1560 s) at the 110° C. reaction temperature, the temperature controller was set at 112° C. and this temperature was achieved 2 minutes (120 s) later. After 4 minutes (240 s) at the 112° C. reaction temperature, the temperature controller was set at 115° C. and this temperature was achieved 4 minutes (240 s) later. Ater 250 minutes (15,000 s) at the 115° C. reaction temperature, titration of a sample of the vinyl ester demonstrated the presence of 0.42 percent carboxylic acid. Infrared spectrophotometric analysis demonstrated substantially complete disappearance of epoxide groups, appearance of ester groups and presence of both triazine and oxazoline groups. The reactor was cooled to 80° C. then phenothiazine (0.155 grams) and styrene (217.25 grams) were sequentially added to the reactor. The vinyl ester resin containing triazine and oxazoline groups (603.2 grams) was recovered as a transparent, light yellow-colored liquid.

EXAMPLE 5

A portion (100 grams) of the styrenated vinyl ester resin of Example 4-D and a portion (300 grams) of the styrenated vinyl ester resin of Comparative Experiment A were thoroughly mixed together to provide a 25 to 75 percent by weight solution, respectively.

EXAMPLE 6

Portions of the vinyl ester resins of Example 4-D and Example 5 were used to prepare clear, unfilled ⅛ inch (0.3175 cm) castings using the method of Example 3. Physical and mechanical properties were evaluated using the method of Example 3. The results are reported in Table II and may be directly compared with the results reported in Table I for Comparative Experiment A.

TABLE II

| | Example 4-D | Example 5 |
|---|---|---|
| Brookfield Viscosity (cp) | 190 | 267 |
| SPI Gel Test | | |
| gel time, min./sec. | 15.4/924 | 10.35/621 |
| cure time, min./sec. | 20.8/1248 | 12.75/765 |
| maximum exotherm °F./°C. | 358/181 | 410/210 |
| Barcol Hardness | 38 | 42 |
| Heat Distortion Temperature °F./°C. | 213.4/100.8 | 228.2/109 |
| Tensile Strength $\times 10^{-3}$ psi/kPa | 11.5/79.3 | 13.1/90.3 |
| Elongation (%) | 3 | 4.2 |
| Flexural Strength $\times 10^{-3}$ psi/kPa | 23.0/158.6 | 22.2/153.1 |
| Flexural Modulus $\times 10^{-5}$ psi/kPa | 5.45/37.58 | 5.65/89.96 |

EXAMPLE 7

Portions of the vinyl ester resins of Example 1-D, Example 2, Example 4-D, Example 5 and Comparative Experiment A were used to prepare 0.0625 inch clear, unfilled castings and cured using the method of Example 3. A test piece was prepared from each casting so as to have the following measurements: 6.5 inches (16.51 cm) length, 0.625 inch (1.5875 cm) width at tab ends, routed to a 0.4 inch (1.016 cm) width at center. Each test piece was used for plane strain compression testing with applied tension using the methods of P. B. Bowden and J. A. Jukes reported in the "Journal of Material Science," 3, 183 (1968) and 7, 52 (1972). The sample cross-sectional area was 0.025 square inch (0.161 cm$^2$) and tensile load was increased in 564 psi (3889 kPa) increments. The creep rate taken as yield was approximately 0.002 inch per minute (0.3048 cm/s). Tension (psi) versus compression (psi) yield point values thus obtained were plotted. Tensile and compressive yield strength values were determined by extrapolation of the plotted biaxial yield line. Ductility was calculated as the ratio of compression at break to the compressive yield strength; and that value was substracted from one. Alternately, ductility may be calculated as the ratio of tension at break to the tensile yield strength. The results are given in Table III.

TABLE III

|  | Example 1-D | Example 2 | Example 4-D | Example 5 | Comparative Experiment A* |
|---|---|---|---|---|---|
| Ductility | 0.6 | 0.65 | 0.75 | 0.82 | 0.15 |
| Tension at Break (psi/MPa) | 8,848/61 | 9,221/64 | 11,039/76 | 11,146/77 | 3,075/21 |
| Compression at Break (psi/MPa) | 7,995/55 | 7,334/51 | 5,071/35 | 3,645/25 | 17,550/121 |
| Tensile Yield Strength (psi/MPa) | 14,800/102 | 14,250/98 | 14,900/103 | 13,750/95 | ** |
| Compressive Yield Strength (psi/MPa) | 19,812/137 | 20,800/143 | 20,516/141 | 19,990/138 | 20,572/142 |

*Not an example of the invention.
**Could not be accurately extrapolated with datapoints collected.

I claim:

1. A vinyl ester resin composition containing triazine groups or both triazine and oxazoline groups prepared by reacting (a) a polyepoxide containing triazine groups, or (b) a polyepoxide containing both triazine and oxazoline groups, or (c) a mixture of (a) and (b) above with (d) from about 0.75 to about 1 mole of a monounsaturated monocarboxylic acid or mixture of monounsaturated monocarboxylic acids per epoxide group in the presence of (e) an effective quantity of a suitable catalyst.

2. A vinyl ester resin of claim 1 wherein
   (i) the quantity of monounsaturated monocarboxylic acid is from about 0.9 to about 1 mole per epoxide group;
   (ii) said polyepoxide containing triazine groups is that product which results from (I) reacting (A) at least one material having an average of more than one aromatic hydroxyl group per molecule with (B) at least 0.01 but not more than 0.95 moles of cyanogen halide or mixture of cyanogen halides per aromatic hydroxyl group in the presence of (C) a suitable base in a quantity of from about 0.01 to about 1.1 moles per aromatic hydroxyl group at a temperature and time sufficient to essentially complete the reaction and thereafter recovering the resultant cyanate mixture; (II) trimerizing the product resulting from (I) in the presence of a suitable trimerization catalyst at a temperature and time to essentially complete the trimerization reaction; (III) epoxidizing the resultant trimerized product from step (II) in a conventional manner by reaction with an epihalohydrin with subsequent dehydrohalogenation with a basic-acting material and finally recovering the resultant glycidyl ether product; and
   (iii) said polyepoxide containing both triazine and oxazoline groups is that product which results from (1) reacting (A) at least one material having an average of more than one aromatic hydroxyl group per molecule with (B) at least 0.01 but not more than 0.95 moles of cyanogen halide or mixture of cyanogen halides per aromatic hydroxyl group in the presence of (C) a suitable base in a quantity of from about 0.01 to about 1.1 moles per aromatic hydroxyl group at a temperature and time sufficient to essentially complete the reaction and thereafter recovering the resultant cyanate mixture; (2) co-oligomerizing the product resulting from (1) with (D) an epoxy resin wherein the mole ratio of epoxy groups to nitrile groups is from about 1:10 to about 1:100 in the presence of a suitable co-oligomerization catalyst at a temperature and time to essentially complete the co-oligomerization.

3. A vinyl ester resin of claim 2 wherein
   (i) the ratio of aromatic hydroxyl groups contained in (A):moles of (B):moles of (C) is from about 1:0.05:0.05 to about 1:0.55:0.6;
   (ii) steps (I) and (1) are conducted at a temperature of from about −40° C. to about 60° C. for from about 10 minutes to about 120 minutes;
   (iii) step (II) is conducted at a temperature of from about 70° C. to about 350° C. for from about 15 minutes to about 120 minutes; and
   (iv) the mole ratio of epoxy groups to nitrile groups is from about 1:10 to about 1:40.

4. A vinyl ester resin of claim 3 wherein
   (i) steps (I) and (1) are conducted at a temperature of from about −20° C. to about 25° C. for from about 10 minutes to about 60 minutes; and
   (ii) step (II) is conducted at a temperature of from about 70° C. to about 200° C. for from about 30 minutes to about 75 minutes.

5. A vinyl ester resin of claim 4 wherein
   (i) component (A) is a compound represented by the following formulas

I.

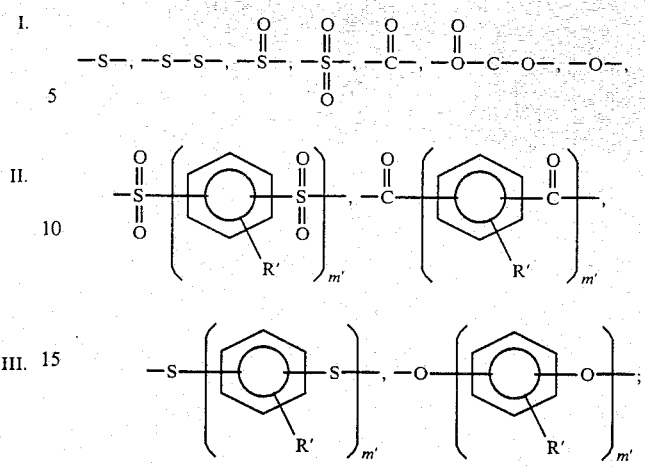

II.

III.

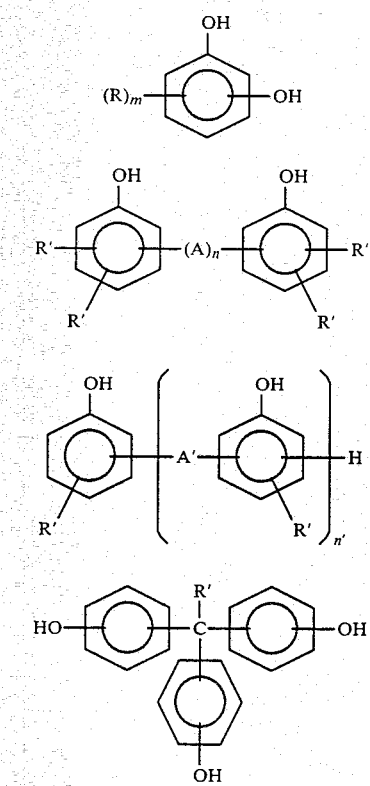

IV.

wherein A is a divalent hydrocarbon group having from 1 to about 12 carbon atoms, each A' is independently a divalent hydrocarbon group having from 1 to about 3 carbon atoms; each R is independently hydrogen, halogen, a hydrocarbyl group having from 1 to about 6 carbon atoms or a hydroxyl group; each R' is independently hydrogen or a hydrocarbyl group having from 1 to about 6 carbon atom or a halogen; m has a value from zero to about 2; m' has a value from 1 to about 100; n has a value of zero or 1 and n' has a value from about 1.01 to about 6;

(ii) component (B) is a cyanogen chloride, cyanogen bromide or a mixture thereof;
(iii) component (C) is a trialkylamine;
(iv) component (D) is represented by the following formulas

V.

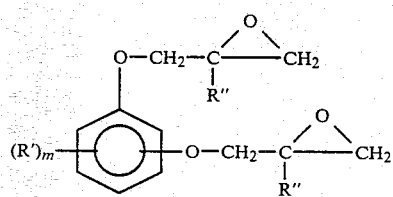

VI.

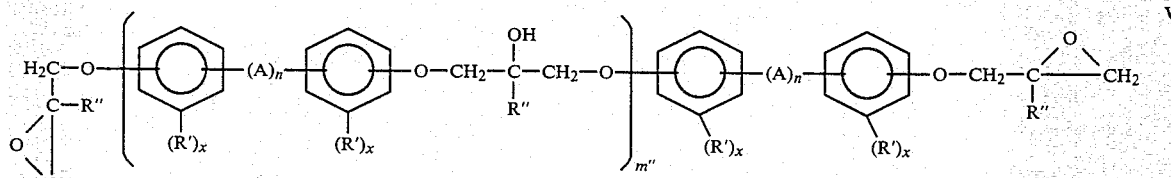

VII.

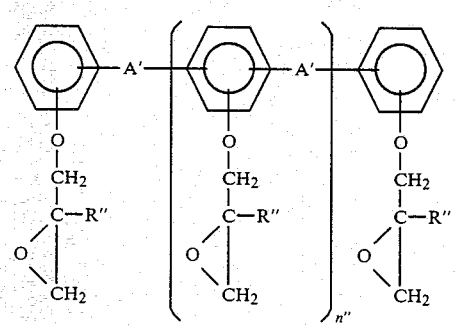

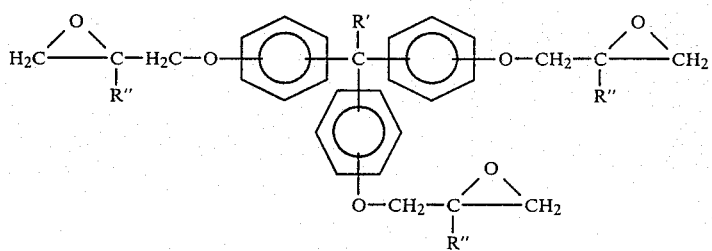

VIII.

wherein A, A', R', m and n are as defined above, x has a value of from 0 to about 4 and n" has a value of from 0 to about 25; m" has a value of from 0 to about 40; and R" is hydrogen or a hydrocarbyl group having from 1 to about 4 carbon atoms;

(v) said trimerization or co-oligomerization catalyst is a metal salt of a carboxylic acid;

(vi) said epihalohydrin is epichlorohydrin; and (vii) said basic-acting material is an alkali metal hydroxide.

6. A vinyl ester resin of claim 5 wherein (i) component (A) is a compound represented by formula II;

(ii) component (C) is triethylamine; and (iii) component (D) is an epoxy resin represented by formula VI;

(iv) said trimerization or co-oligomerization catalyst is cobalt naphthenate; and (v) said basic-acting material is sodium hydroxide.

7. A vinyl ester resin of claim 6 wherein (i) in component (A), A is a divalent hydrocarbon group having from 1 to about 12 carbon atoms and n has a value of 1; and (ii) in component (D), each A is independently a divalent hydrocarbon group having from 1 to about 12 carbon atoms, n has a value of 1 and m" has an average value of from about 0 to about 40.

8. A vinyl ester resin of claim 7 wherein (i) in component (A), A is an isopropylidine group; and (ii) in component (D), A is an isopropylidine group and m" has an average value of from about 0.1 to about 20.

9. A composition comprising (1) from about 1 to about 99 percent by weight of a vinyl ester resin of claims 1, 2, 3, 4, 5, 6, 7 or 8 and (2) from about 99 to about 1 percent by weight of at least one copolymerizable ethylenically unsaturated monomer.

10. A composition of claim 9 wherein the quantity of vinyl ester resin is from about 30 to about 70 percent by weight and the quantity of polymerizable ethylenically unsaturated monomer(s) is from about 70 to about 30 percent by weight.

11. A composition of claim 10 wherein said copolymerizable ethylenically unsaturated monomer is styrene, vinyl toluene, α-methylstyrene, halogenated styrene, t-butylstyrene, divinylbenzene, methylmethacrylate, acrylic acid or a mixture of any two or more of such monomers.

12. A cured composition resulting from subjecting a mixture containing (a) a composition of claim 9 and (b) an effective quantity of one or more polymerization catalysts or accelerators or a mixture thereof to conditions for curing said mixture.

13. A cured composition of claim 12 wherein said polymerization catalyst is at least one of benzoyl peroxide, methylethylketone peroxide or t-butyl hydroperoxide and said accelerator, when present, is at least one of cobalt napthenate or N,N-dimethylaniline.

14. A cured composition resulting from subjecting a mixture containing (a) a composition of claim 10 and (b) an effective quantity of one or more polymerization catalysts or accelerators or a mixture thereof to conditions for curing said mixture.

15. A cured composition of claim 14 wherein said polymerization catalyst is at least one of benzoyl peroxide, methylethylketone peroxide or t-butyl hydroperoxide and said accelerator, when present, is at least one of cobalt napthenate or N,N-dimethylaniline.

16. A cured composition resulting from subjecting a mixture containing (a) a composition of claim 11 and (b) an effective quantity of one or more polymerization catalysts or accelerators or a mixture thereof to conditions for curing said mixture.

17. A cured composition of claim 16 wherein said polymerization catalyst is at least one of benzoyl peroxide, methylethylketone peroxide or t-butyl hydroperoxide and said accelerator, when present, is at least one of cobalt napthenate or N,N-dimethylaniline.

18. A composition comprising (A) from about 1 to about 99 percent by weight of a vinyl ester resin composition of claims 1, 2, 3, 4, 5, 6, 7 or 8 and (B) from 99 to about 1 percent by weight of a vinyl ester resin resulting from reacting (1) an epoxy resin represented by formulas VI or VIII or a mixture of such epoxy resins and (2) at least one acrylic or methacrylic acid; wherein components (B-1) and (B-2) are employed in quantities which provides a ratio of acid groups to epoxide groups of from about 0.75:1 to about 1:1.

19. A composition of claim 18 wherein component (A) is present in a quantity of from about 5 to about 50 percent by weight and component (B) is present in a quantity of from about 95 to about 50 percent by weight and components (B-1) and (B-2) are present in a quantity which provides a ratio of acid groups to epoxide groups of from about 0.9:1 to about 1:1.

20. A composition comprising (I) from about 1 to about 99 percent by weight of a composition of claim 18 and (II) from about 99 to about 1 percent by weight of at least one copolymerizable ethylenically unsaturated monomer.

21. A composition of claim 20 wherein the quantity of component (I) is from about 30 to about 70 percent by weight and the quantity of component (II) is from about 70 to about 30 percent by weight.

22. A composition of claim 21 wherein said copolymerizable ethylenically unsaturated monomer is styrene, vinyl toluene, α-methylstyrene, halogenated styrene, t-butylstyrene, divinylbenzene, methylmethacrylate, acrylic acid or a mixture of any two or more of such monomers.

23. A cured composition resulting from subjecting a mixture containing (a) a composition of claim 20 and (b) an effective quantity of one or more polymerization catalysts or accelerators to conditions for curing said mixture.

24. A cured composition of claim 23 wherein said polymerization catalyst is at least one of benzoyl peroxide, methylethylketone peroxide or t-butyl hydroperoxide and said accelerator, when present, is at least one of cobalt napthenate or N,N-dimethylaniline.

25. A cured composition resulting from subjecting a mixture containing (a) a composition of claim 21 and (b) an effective quantity of one or more polymerization catalysts or accelerators to conditions for curing said mixture.

26. A cured composition of claim 25 wherein said polymerization catalyst is at least one of benzoyl peroxide, methylethylketone peroxide or t-butyl hydroperoxide and said accelerator, when present, is at least one of cobalt napthenate or N,N-dimethylaniline.

27. A cured composition resulting from subjecting a mixture containing (a) a composition of claim 22 and (b) an effective quantity of one or more polymerization catalysts or accelerators to conditions for curing said mixture.

28. A cured composition of claim 27 wherein said polymerization catalyst is at least one of benzoyl peroxide, methylethylketone peroxide or t-butyl hydroperoxide and said accelerator, when present, is at least one of cobalt napthenate or N,N-dimethylaniline.

* * * * *